US010242210B2

(12) United States Patent
Girard et al.

(10) Patent No.: US 10,242,210 B2
(45) Date of Patent: Mar. 26, 2019

(54) METHOD FOR MANAGING CONTENT ON A SECURE ELEMENT CONNECTED TO AN EQUIPMENT

(75) Inventors: Pierre Girard, La Destrousse (FR); Philippe Proust, Marseilles (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 13/991,823

(22) PCT Filed: Dec. 5, 2011

(86) PCT No.: PCT/EP2011/071781
§ 371 (c)(1),
(2), (4) Date: Aug. 6, 2013

(87) PCT Pub. No.: WO2012/076482
PCT Pub. Date: Jun. 14, 2012

(65) Prior Publication Data
US 2013/0318355 A1    Nov. 28, 2013

Related U.S. Application Data

(63) Continuation-in-part of application No. 13/312,309, filed on Dec. 6, 2011, now Pat. No. 9,301,145.

(30) Foreign Application Priority Data

Dec. 6, 2010    (EP) .................................. 10306359

(51) Int. Cl.
*H04L 9/08*      (2006.01)
*G06F 21/62*     (2013.01)
(Continued)

(52) U.S. Cl.
CPC ............ *G06F 21/6218* (2013.01); *G06F 8/61* (2013.01); *H04B 1/3816* (2013.01);
(Continued)

(58) Field of Classification Search
CPC . G06F 21/6218; H04L 63/0428; H04L 63/08; H04L 63/083; H04L 63/123;
(Continued)

(56) References Cited

U.S. PATENT DOCUMENTS 6,978,152 B1    12/2005 Yamaashi et al.
7,024,390 B1    4/2006 Mori et al.
(Continued)

FOREIGN PATENT DOCUMENTS

CN    101080051 A    11/2007
CN    101179401 A    5/2008
(Continued)

OTHER PUBLICATIONS

Partial European Search Report dated Jul. 22, 2011, by the European Patent Office in the European Application No. 10 30 6359. (7 pages).
(Continued)

*Primary Examiner* — Saleh Najjar
*Assistant Examiner* — Devin E Almeida
(74) *Attorney, Agent, or Firm* — Buchanan Ingersoll & Rooney PC

(57) ABSTRACT

The invention concerns a method for managing content on a secure element connected to an equipment, this content being managed on the secure element from a distant administrative platform. According to the invention, the method consists in: establishing, at the level of the administrative platform a secure channel between the equipment and the administrative platform, thanks to session keys generated by the secure element and transmitted to the equipment; transmitting to the administrative platform a request to manage content of the secure element; and verifying at the level of the administrative platform that this request originates from the same secure element that has generated the session keys
(Continued)

and, if positive, authorizing the management and, if negative, forbid this management.

6 Claims, 2 Drawing Sheets

(51) Int. Cl.

| | | |
|---|---|---|
| *H04W 8/24* | (2009.01) | |
| *H04W 12/10* | (2009.01) | |
| *G06F 8/61* | (2018.01) | |
| *H04W 4/70* | (2018.01) | |
| *H04W 4/50* | (2018.01) | |
| *H04W 4/60* | (2018.01) | |
| *H04W 8/20* | (2009.01) | |
| *H04W 12/04* | (2009.01) | |
| *H04L 29/06* | (2006.01) | |
| *H04W 12/06* | (2009.01) | |
| *H04L 29/08* | (2006.01) | |
| *H04W 8/22* | (2009.01) | |
| *H04W 8/18* | (2009.01) | |
| *H04B 1/3816* | (2015.01) | |
| *H04W 12/08* | (2009.01) | |
| *H04W 84/04* | (2009.01) | |

(52) U.S. Cl.
CPC ........ *H04L 9/0825* (2013.01); *H04L 63/0428* (2013.01); *H04L 63/08* (2013.01); *H04L 63/083* (2013.01); *H04L 63/123* (2013.01); *H04L 67/34* (2013.01); *H04W 4/50* (2018.02); *H04W 4/60* (2018.02); *H04W 4/70* (2018.02); *H04W 8/183* (2013.01); *H04W 8/205* (2013.01); *H04W 8/22* (2013.01); *H04W 8/245* (2013.01); *H04W 12/04* (2013.01); *H04W 12/06* (2013.01); *H04W 12/08* (2013.01); *H04W 12/10* (2013.01); *H04W 8/18* (2013.01); *H04W 84/04* (2013.01)

(58) Field of Classification Search
CPC ..... H04W 12/04; H04W 12/06; H04W 12/08; H04W 12/10
See application file for complete search history.

(56) References Cited

U.S. PATENT DOCUMENTS

| | | | |
|---|---|---|---|
| 7,146,161 B2 | 12/2006 | Chou | |
| 7,349,719 B2 | 3/2008 | Buniatyan | |
| 7,363,056 B2 | 4/2008 | Faisy | |
| 8,392,980 B1* | 3/2013 | Ahrens | H04L 63/166 |
| | | | 380/247 |
| 9,092,775 B2 | 7/2015 | Bernard et al. | |
| 9,560,025 B2* | 1/2017 | Chastain | H04L 63/0869 |
| 9,729,526 B2* | 8/2017 | Chastain | H04L 63/0478 |
| 2002/0186845 A1 | 12/2002 | Dutta et al. | |
| 2004/0131186 A1 | 7/2004 | Kasuya et al. | |
| 2004/0235523 A1 | 11/2004 | Schrire et al. | |
| 2004/0242209 A1* | 12/2004 | Kruis | H04W 4/24 |
| | | | 455/414.1 |
| 2005/0021875 A1 | 1/2005 | Bouthemy et al. | |
| 2005/0164737 A1 | 7/2005 | Brown | |
| 2005/0186954 A1 | 8/2005 | Kenney | |
| 2005/0239504 A1 | 10/2005 | Ishii et al. | |
| 2005/0266883 A1 | 12/2005 | Chatrath | |
| 2005/0279826 A1 | 12/2005 | Merrien | |
| 2006/0049243 A1 | 3/2006 | Sakamura et al. | |
| 2006/0079284 A1 | 4/2006 | Lu et al. | |
| 2006/0086785 A1 | 4/2006 | Sakata | |
| 2006/0196931 A1* | 9/2006 | Holtmanns et al. | 235/380 |
| 2006/0199614 A1 | 9/2006 | Hyacinthe | |
| 2006/0205388 A1* | 9/2006 | Semple | H04L 63/0853 |
| | | | 455/411 |
| 2007/0105532 A1 | 5/2007 | Martin et al. | |
| 2007/0239857 A1 | 10/2007 | Mahalal et al. | |
| 2008/0090614 A1 | 4/2008 | Sicher et al. | |
| 2008/0130879 A1 | 6/2008 | Heinonen et al. | |
| 2008/0178004 A1* | 7/2008 | Wei | H04L 63/0869 |
| | | | 713/171 |
| 2008/0261561 A1* | 10/2008 | Gehrmann | 455/411 |
| 2008/0292074 A1 | 11/2008 | Boni et al. | |
| 2008/0319823 A1 | 12/2008 | Ahn et al. | |
| 2009/0159692 A1 | 6/2009 | Chew et al. | |
| 2009/0163175 A1 | 6/2009 | Shi et al. | |
| 2009/0191857 A1 | 7/2009 | Horn et al. | |
| 2009/0191917 A1 | 7/2009 | Zappulla et al. | |
| 2009/0191918 A1 | 7/2009 | Mardiks | |
| 2009/0215431 A1 | 8/2009 | Koraichi | |
| 2009/0217348 A1* | 8/2009 | Salmela | H04L 63/08 |
| | | | 726/2 |
| 2009/0228705 A1* | 9/2009 | Cho | H04L 9/3226 |
| | | | 713/158 |
| 2009/0307142 A1 | 12/2009 | Mardikar | |
| 2010/0179907 A1 | 7/2010 | Atkinson | |
| 2011/0028126 A1* | 2/2011 | Lim | H04L 63/0853 |
| | | | 455/411 |
| 2011/0035584 A1 | 2/2011 | Meyerstein et al. | |
| 2011/0059773 A1 | 3/2011 | Neumann et al. | |
| 2011/0081950 A1 | 4/2011 | Guven | |
| 2011/0126183 A1 | 5/2011 | Bernard et al. | |
| 2011/0136482 A1 | 6/2011 | Kaliner | |
| 2011/0237190 A1 | 9/2011 | Jolivet | |
| 2011/0302641 A1 | 12/2011 | Hald et al. | |
| 2011/0320600 A1 | 12/2011 | Froeding et al. | |
| 2012/0028609 A1 | 2/2012 | Hruska | |
| 2012/0108295 A1 | 5/2012 | Schell et al. | |
| 2012/0113865 A1 | 5/2012 | Zhao et al. | |
| 2012/0117635 A1* | 5/2012 | Schell | G06F 21/34 |
| | | | 726/9 |
| 2012/0190354 A1 | 7/2012 | Merrien et al. | |
| 2012/0297473 A1 | 11/2012 | Case et al. | |
| 2013/0023236 A1* | 1/2013 | Murray | H04W 8/245 |
| | | | 455/411 |
| 2013/0067552 A1* | 3/2013 | Hawkes | H04L 63/166 |
| | | | 726/7 |
| 2013/0117824 A1* | 5/2013 | Naslund | H04L 9/0841 |
| | | | 726/4 |
| 2013/0203465 A1* | 8/2013 | Ali | H04W 4/003 |
| | | | 455/558 |
| 2013/0283047 A1* | 10/2013 | Merrien | H04W 12/08 |
| | | | 713/164 |
| 2013/0318355 A1 | 11/2013 | Girard et al. | |
| 2013/0324091 A1 | 12/2013 | Girard et al. | |
| 2013/0329683 A1 | 12/2013 | Berard et al. | |
| 2014/0019760 A1 | 1/2014 | Vergnes et al. | |
| 2014/0024343 A1 | 1/2014 | Bradley | |
| 2014/0031083 A1 | 1/2014 | Vergnes et al. | |
| 2014/0057680 A1 | 2/2014 | Proust et al. | |
| 2014/0066011 A1 | 3/2014 | Bradley | |
| 2014/0122872 A1 | 5/2014 | Merrien et al. | |
| 2014/0141747 A1 | 5/2014 | Merrien et al. | |
| 2014/0359741 A1* | 12/2014 | Kistner | H04L 63/0823 |
| | | | 726/7 |

FOREIGN PATENT DOCUMENTS

| | | |
|---|---|---|
| CN | 101309518 A | 11/2008 |
| DE | 10 2008 033 976 A1 | 1/2010 |
| EP | 1 650 717 A1 | 4/2006 |
| EP | 1 965 596 A1 | 9/2008 |
| EP | 2 056 523 A1 | 5/2009 |
| EP | 2 076 071 A1 | 7/2009 |
| FR | 2 871 020 A1 | 12/2005 |
| GB | 2 457 221 A | 8/2009 |
| JP | 2002-236572 A | 8/2002 |
| JP | 2005-323128 A | 11/2005 |
| JP | 2006-050554 A | 2/2006 |
| JP | 2006-107316 A | 4/2006 |
| JP | 2007-019897 A | 1/2007 |

(56) References Cited

FOREIGN PATENT DOCUMENTS

| | | |
|---|---|---|
| JP | 2007-513534 A | 5/2007 |
| JP | 2007-201883 A | 8/2007 |
| JP | 2007-235492 A | 9/2007 |
| JP | 2008-131469 A | 6/2008 |
| JP | 2008-519343 A | 6/2008 |
| JP | 2009-037602 A | 2/2009 |
| JP | 2009-038598 A | 2/2009 |
| JP | 2010-501092 A | 1/2010 |
| JP | 2010-532107 A | 9/2010 |
| JP | 2011-525311 A | 9/2011 |
| JP | 2012-528534 A | 11/2012 |
| KR | 2002-0066032 A | 8/2002 |
| KR | 2003-0044260 A | 6/2003 |
| KR | 10-0489783 B1 | 5/2005 |
| KR | 10-2005-0095424 A | 9/2005 |
| KR | 2007-0095048 A | 9/2007 |
| KR | 10-2008-0014285 A | 2/2008 |
| KR | 10-2008-0015870 A | 2/2008 |
| KR | 10-2009-0056019 A | 6/2009 |
| KR | 10-2010-0095648 A | 8/2010 |
| KR | 10-2010-011642 A | 10/2010 |
| WO | 02/082715 A1 | 10/2002 |
| WO | 03/104997 A1 | 12/2003 |
| WO | 2004/021296 A1 | 3/2004 |
| WO | 2004/105421 A2 | 12/2004 |
| WO | 2007/058241 A1 | 5/2007 |
| WO | 2008/128874 A1 | 10/2008 |
| WO | WO 2008/123827 A1 | 10/2008 |
| WO | 2009/055910 A1 | 5/2009 |
| WO | 2009/092115 A2 | 7/2009 |
| WO | 2009091837 A1 | 7/2009 |
| WO | 2009/095295 A1 | 8/2009 |
| WO | WO 2009/103623 A2 | 8/2009 |
| WO | 2009/141024 A1 | 11/2009 |
| WO | 2009/141035 A1 | 11/2009 |
| WO | 2009/149788 A2 | 12/2009 |
| WO | 2010/052332 A1 | 5/2010 |
| WO | 2010068016 A3 | 6/2010 |
| WO | 2010/138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

An English Translation of the Office Action (Notice of Reasons for Rejection) dated Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the MILENAGE Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
International Search Report (Form PCT/ISA/210) and the Written Opinion of the International Searching Authority (Form PCT/ISA/237) dated Feb. 22, 2012, by the European Patent Office in the International Application No. PCT/EP2011/071674. (8 pages).
Madlmayr et al., "The Benefit of using SIM Application Toolkit in the Context of Near Field Communication Applications" International Conference on the Management of Mobile Business, (Jul. 2007), (8 pages).
International Search Report (Form PCT/ISA/210) and the Written Opinion of the International Searching Authority (Form PCT/ISA/237) dated Feb. 27, 2012, by the European Patent Office in the International Application No. PCT/EP2011/071660. (6 pages).
An English Translation of the Office Action (Notice of Reasons for Rejection) dated Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) dated Mar. 28, 2012, by the European Patent Office in the International Application No. PCT/EP2011/071737. (6 pages).
An English Translation of the Office Action (Notice of Reasons for Rejection) dated Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) dated Feb. 15, 2012, by the European Patent Office in the International Application No. PCT/EP2011/071778. (9 pages).
International Search Report (Form PCT/ISA/210) and the Written Opinion of the International Searching Authority (Form PCT/ISA/237) dated Feb. 22, 2012, by the European Patent Office in the International Application No. PCT/EP2011/071675. (12 pages).
International Search Report (Form PCT/ISA/210) and the Written Opinion of the International Searching Authority (Form PCT/ISA/237) dated Apr. 4, 2012, by the European Patent Office in the International Application No. PCT/EP2011/071731. (12 pages).
"3rd Generation Partnership Project; Technical Specification Group Services and System Aspects; Service aspects; Service principles (Release 11)", 3GPP TS 22.101 V11.0.0 (Sep. 2010), pp. 1-60.
International Search Report (Form PCT/ISA/210) and the Written Opinion of the International Searching Authority (Form PCT/ISA/237) dated Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) dated Feb. 27, 2012, by the European Patent Office in the International Application No. PCT/EP2011/071664. (8 pages).
Written Opinion of the International Preliminary Examining Authority (Form PCT/IPEA/408) dated Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) dated Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) dated Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) dated Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.
Office Action issued by the U.S. Patent and Trademark Office in the U.S. Appl. No. 13/312,309, dated Sep. 25, 2013, U.S. Patent and Trademark Office, Alexandria, VA. (13 pages).
Office Action issued by the U.S. Patent and Trademark Office in the U.S. Appl. No. 13/312,309, dated Apr. 24, 2014, U.S. Patent and Trademark Office, Alexandria, VA. (13 pages).
"3rd Generation Partnership Project; Technical Specification Group Services and System Aspects; Feasibility Study on Remote Management of USIM Application on M2M Equipment; (Release 8)", 3GPP TR 33.812, Global System for Mobile Communications, No. v1.0.0, Sep. 1, 2008, pp. 1-80, XP-050376873.
"IP Based Over-the-Air Handset Configuration Management (IOTA-HCM), 3rd Generation Partnership Project 2 3GPP2", 3GPP2 C.S0040, version 1.0, Jul. 18, 2003, pp. 1-68, XP-055018395.
Smart Cards: Card Application Toolkit (CAT) (Release 9), ETSI TS 102 223, Technical Specification, vol. SCP TEC, No. V9.2.0, Oct. 1, 2010, pp. 1-209, XP-014061352.

(56) References Cited

OTHER PUBLICATIONS

International Search Report (PCT/ISA/210) dated Feb. 27, 2012, by the European Patent Office as the International Searching Authority for International Application No. PCT/EP2011/071781.
Written Opinion (PCT/ISA/237) dated Feb. 27, 2012, by the European Patent Office'as the International Searching Authority for International Application No. PCT/EP2011/071781.
IP Based Over-the-Air Handset Configuration Management (IOTA-HCM), Jul. 11, 2003, pp. 1-68, retrieved from the internet: http://www.3gpp2.org/public_html/specs/C.S0040-0_v1.0_110403.pdf.
Office Action (Notice of Reasons for Rejection) dated Aug. 19, 2014, by the Japan Patent Office in corresponding Japanese Patent Application No. 2013-542497, and an English Translation of the Office Action. (9 pages).
Office Action (Notice of Preliminary Rejection) dated Jun. 27, 2014, by the Korean Intellectual Property Office, in Korean Patent Application No. 10-2013-7017637, and an English Translation of the Office Action. (7 pages).
Office Action (Notice of Preliminary Rejection) dated Aug. 19, 2014, by the Korean Intellectual Property Office in Korean Patent Application No. 10-2013-7016486, and an English Translation of the Office Action. (6 pages).
Office Action (Notice of Reasons for Rejection) dated Aug. 5, 2014, by the Japan Patent Office in Japanese Patent Application No. 2013-542474, and an English Translation of the Office Action. (4 pages).
Office Action issued by the U.S. Patent and Trademark Office in the U.S. Appl. No. 13/991,846, dated Feb. 10, 2015, U.S. Patent and Trademark Office, Alexandria, VA. (26 pages).
Office Action issued by the U.S. Patent and Trademark Office in the U.S. Appl. No. 13/992,065, dated Dec. 18, 2014, U.S. Patent and Trademark Office, Alexandria, VA. (26 pages).
Office Action issued by the U.S. Patent and Trademark Office in the U.S. Appl. No. 13/991,744, dated Dec. 12, 2014, U.S. Patent and Trademark Office, Alexandria, VA. (33 pages).
Notice of Allowance issued by the U.S. Patent and Trademark Office in the U.S. Appl. No. 13/991,752, dated Jan. 21, 2015, U.S. Patent and Trademark Office, Alexandria, VA. (33 pages).
English translation of Office Action issued by the Korean Patent Office dated Aug. 28, 2014 in corresponding Korean Application No. 10-2013-7016004. (3 pages).
English translation of Office Action issued by the Korean Patent Office dated Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
Office Action issued by the U.S. Patent and Trademark Office in the U.S. Appl. No. 13/991,766, dated Mar. 17, 2015, U.S. Patent and Trademark Office, Alexandria, VA. (33 pages).
Office Action issued by the U.S. Patent and Trademark Office in the U.S. Appl. No. 13/992,039, dated Mar. 17, 2015, U.S. Patent and Trademark Office, Alexandria, VA. (35 pages).
Office Action (Notice of Preliminary Rejection) dated Feb. 25, 2015, by the Korean Patent Office in Korean Patent Application No. 10-2013-0717638, and an English Translation of the Office Action. (7 pages).
Office Action issued by the U.S. Patent and Trademark Office in the U.S. Appl. No. 13/991,744, dated Jun. 2, 2015, U.S. Patent and Trademark Office, Alexandria, VA. (35 pages).
Office Action issued by the U.S. Patent and Trademark Office in the U.S. Appl. No. 13/991,689, dated Jun. 18, 2015, U.S. Patent and Trademark Office, Alexandria, VA. (46 pages).
Office Action issued by the U.S. Patent and Trademark Office in the U.S. Appl. No. 13/991,912, dated Jul. 23, 2015, U.S. Patent and Trademark Office, Alexandria, VA. (45 pages).
Office Action issued by the U.S. Patent and Trademark Office in the U.S. Appl. No. 13/992,103, dated Jul. 13, 2015, U.S. Patent and Trademark Office, Alexandria, VA. (42 pages).
Office Action issued by the U.S. Patent and Trademark Office in the U.S. Appl. No. 13/992,065, dated Jul. 30, 2015, U.S. Patent and Trademark Office, Alexandria, VA. (32 pages).
Office Action issued by the Chinese Patent Office dated Aug. 19, 2015 in corresponding Chinese Application No. 201180058922.2, and English language translation of Office Action (16 pages).
Office Action issued by the Chinese Patent Office dated Nov. 4, 2015 in corresponding Chinese Application No. 201180058688.3 (5 pages).
Office Action issued by the U.S. Patent and Trademark Office in the U.S. Appl. No. 13/991,766, dated Oct. 1, 2015, U.S. Patent and Trademark Office, Alexandria, VA. (27 pages).
Office Action issued by the U.S. Patent and Trademark Office in the U.S. Appl. No. 13/992,039, dated Oct. 1, 2015, U.S. Patent and Trademark Office, Alexandria, VA. (28 pages).
Office Action issued by the U.S. Patent and Trademark Office in the U.S. Appl. No. 13/991,846, dated Oct. 15, 2015, U.S. Patent and Trademark Office, Alexandria, VA. (23 pages).
Office Action issued by the U.S. Patent and Trademark Office in the U.S. Appl. No. 14/603,889, dated Oct. 23, 2015, U.S. Patent and Trademark Office, Alexandria, VA. (36 pages).
Office Action issued by the Chinese Patent Office dated Aug. 27, 2015 in corresponding Chinese Application No. 201180058683.0, and English language translation of Office Action (17 pages).
Office Action (Notice of Reasons for Rejection) dated Feb. 2, 2016, by the Japanese Patent Office in Japanese Patent Application No. 2015-018547, and an English Translation of the Office Action. (5 pages).
3GPP TS 22.101 V11.0.0 (Sep. 2010), Sep. 2010.
European Office Action dated Dec. 23, 2015 issued in corresponding European Patent Appln. No. 11 810 809.1 (5 pages).
European Office Action dated Jan. 19, 2016 issued in corresponding European Patent Appln. No. 11 811 335.6 (6 pages).
Japanese Office Action dated Jan. 5, 2016 issued in corresponding Japanese Patent Appln. No. 2015-082449, with English translation (5 pages).
Japanese Office Action dated Jan. 19, 2016 issued in corresponding Japanese Patent Appln. No. 2013-054275 with English translation (14 pages).
U.S. Office Action dated Feb. 2, 2016 issued in corresponding U.S. Appl. No. 13/991,912 (30 pages).
U.S. Office Action dated Feb. 2, 2016 issued in corresponding U.S. Appl. No. 13/992,039 (24 pages).
U.S. Office Action dated Feb. 10, 2016 issued in corresponding U.S. Appl. No. 13/992,065 (23 pages).
Office Action dated Nov. 17, 2015 by the Chinese Patent Office in corresponding Chinese Patent Application No. 201180058925.6 (10 pages).
Office Action issued by the U.S. Patent and Trademark Office in U.S. Appl. No. 13/992,103, dated Nov. 25, 2015, U.S. Patent and Trademark Office, Alexandria, VA (22 pages).
Office Action issued by the U.S. Patent and Trademark Office in the U.S. Appl. No. 13/992,103, dated Mar. 30, 2016, U.S. Patent and Trademark Office, Alexandria, VA. (15 pages).
Office Action issued by the U.S. Patent and Trademark Office in the U.S. Appl. No. 13/991,846, dated Apr. 5, 2016, U.S. Patent and Trademark Office, Alexandria, VA. (24 pages).
Office Action dated Jan. 19, 2016, by the European Patent Office in European Patent Application No. 11 811 335.6 (4 pages).
3rd Generation Partnership Project; Technical Specification Group Services and System Aspects; Feasibility study on the security aspects of remote provisioning and change of subscription for Machine to Machine (M2M) equipment (Release 9); 3GPP Draft; 33812-920, published by the 3rd Generation Partnership Project (3GPP) in Sophia-Antipolis Cedex, France on Jun. 22, 2010 (87 pages).

\* cited by examiner

METHOD FOR MANAGING CONTENT ON A SECURE ELEMENT CONNECTED TO AN EQUIPMENT

This disclosure is a national phase of PCT/EP2011/071781, a continuation-in-part of U.S. application Ser. No. 13/312,309, filed Dec. 6, 2011, and claims priority of European Application No. 10306359.0, filed Dec. 6, 2010, the disclosures of which are hereby incorporated by reference.

The present invention concerns a method for managing content on a secure element connected to an equipment.

A secure element is typically a UICC (Universal Integrated Circuit Card) embedding a Sim application, this secure element being installed, fixedly or not, in a terminal, like for example a mobile phone or a machine (for M2M (Machine to Machine) applications).

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the motherboard of the terminal or machine and constitutes an e-UICC.

Some of the known solutions apply to such soldered e-UICCs or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The invention relates to the remote management of a secure element like a UICC located on or in a device that can be infected by a malware. This invention applies to embedded UICCs (e-UICCs) and to removable UICCs. The term "secure element" will be used generally in the following description for designating such an UICC.

It is known that, once issued, the secure element needs to be maintained during its whole life. The maintenance usually consists in remote update of the secure element content. It could be a late stage personalization, a code patch, installation of a new functionality, data update, key renewal, etc. These operations are performed by a remote administration platform that operates through a potentially unsecured network (e.g. the Internet) and a potentially unsecured device to which the secure element is attached.

DETAILED DESCRIPTION

Figure 1:
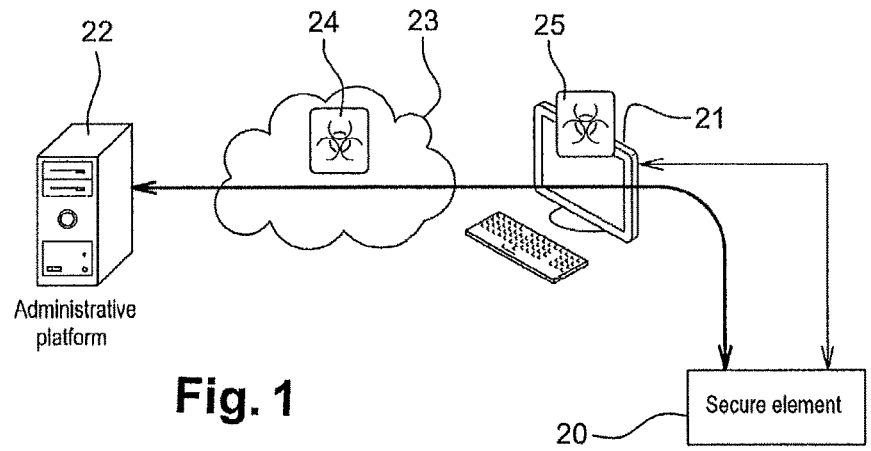
FIG. 1 is a schematic diagram of a system comprising a terminal and remote administrative platform.

FIG. 1 represents a system where a secure element comprised in a terminal 21 downloads content from an administrative platform 22 over the Internet 23. Malware 24 can be present at the level of Internet 23 or malware 25 at the level of the terminal 21.

In order to secure the process, there is usually an end-to-end secure communication protocol between the administration platform and the secure element (e.g. one Global Platform protocol). However, in most cases, neither the server nor the secure element has a direct connectivity to each other and there is some middleware on the device that initiate the secure administration session. It is well known that this first session between the middleware and the server has to be secured as well (e.g. with TLS) for multiple reasons (authentication of remote management request, confidentiality of the request, avoiding denial of service, etc.).

Figure 2:
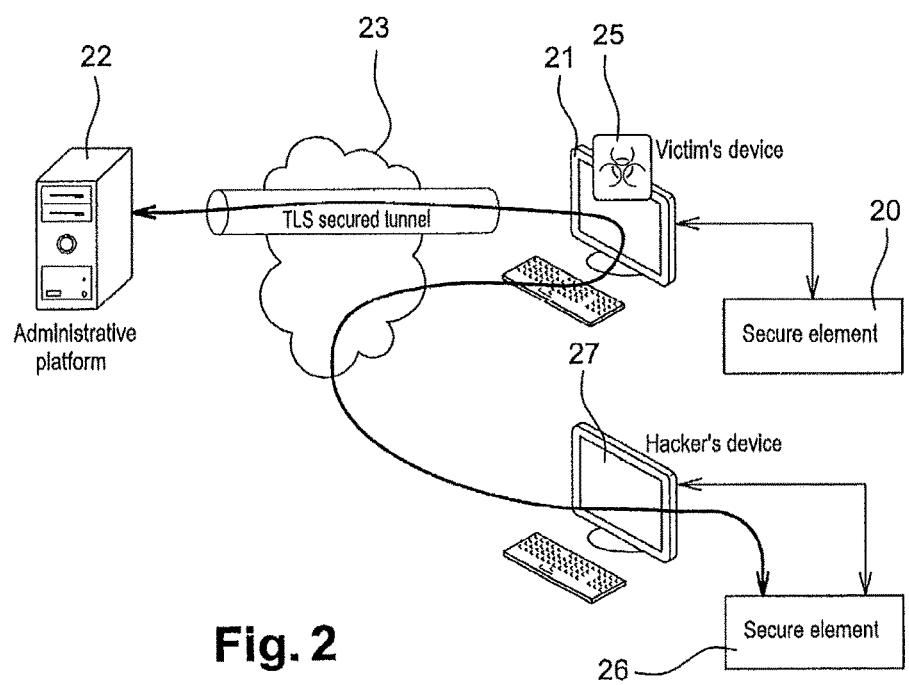
FIG. 2 is a schematic diagram of a system that further includes a hacker's terminal.

However, if some malware is located on a terminal, it can be used by a hacker to perform some remote management on its secure element on behalf of the victim's device on which the malware is sitting as depicted in FIG. 2.

In this figure, the malware 25 is located in victim's terminal 21. Even if the channel between the terminal 21 and the administrative platform 22 is secured through TLS, the malware 25 can direct the content (data and software) to another secure element 26 located in a hacker's terminal 27 through the Internet 23. This redirection of the downloaded content can be very harmful for the owner of terminal 21. For example, in the Telecom domain, it can be foreseen to download an entire SIM application on an existing secure element like 20. For that, the user of terminal 21 connects to the administrative platform 22 through the Internet and asks for a subscription to a given MNO (the administrative platform can be connected to different MNOs as it will be seen later). Platform 22 recognises user's terminal 21 and after this identification, prepares the content to be downloaded (Sim application, data, credentiels among them IMSI and Ki). If the content is loaded on the secure element 26 of the hacker instead on the secure element 20, the owner of terminal 21 will not only not be able to connect to this MNO's network but he will pay for the hacker's communications.

In addition, the credential used to authenticate the device can be stolen by the malware.

Using the secure element as is to authenticate the device is also difficult for two reasons. Firstly the secure element is under management so it is difficult to use it (especially if it is not personalized or if its personalization is not finished). Secondly, the credential it contains may belong to another entity which is not the one operating the remote management platform.

The present invention proposes a solution to these problems.

In this respect, the present invention concerns a method for managing content on a secure element connected to an equipment, the content being managed on the secure element from a distant administrative platform, the method consisting in:
  Establishing, at the level of the administrative platform a secure channel between the equipment and the administrative platform, thanks to session keys generated by the secure element and transmitted to the equipment;
  Transmitting to the administrative platform a request to manage content of the secure element;
  Verifying at the level of the administrative platform that the request originates from the same secure element that has generated the session keys and, if positive, authorizing the management and, if negative, forbid the management.

The aforementioned management consists in at least one of the following tasks:
  Downloading content on the secure element
  Deleting content on the secure element
  Exporting content stored on the secure element
  Activating content stored on the secure element
  Deactivating content stored on the secure element The verification can consist in verifying that the private key used for establishing the secure channel corresponds to a certificate delivered to the secure element on which the management is requested.

In another embodiment, the verification consists in verifying that an identifier corresponding to a symmetrical key used for establishing the secure channel corresponds to an identifier of the secure element on which the management is requested.

Figure 3:
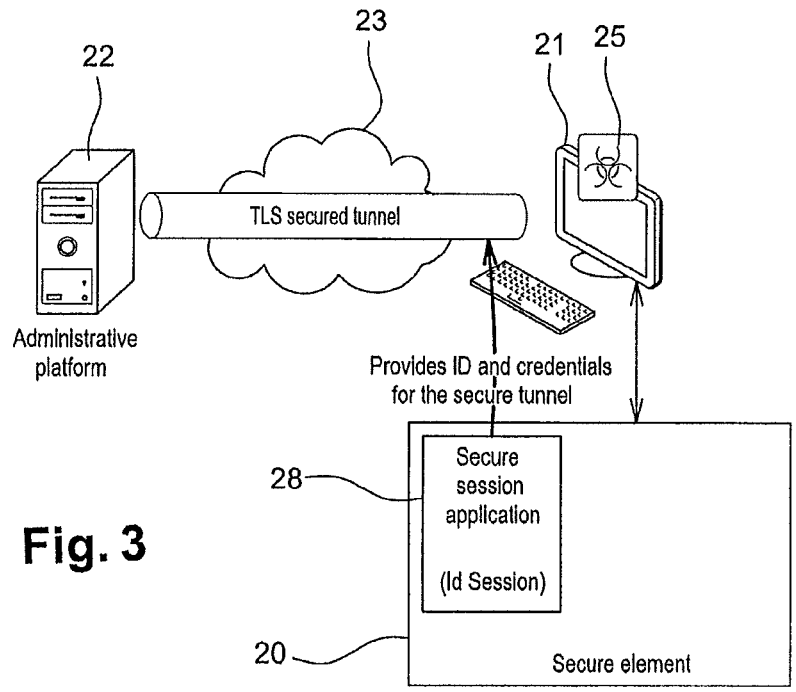
FIGS. 3 and 4 are schematic diagrams that depicts improvements to the system in accordance with the principles of the invention.
Figure 4:
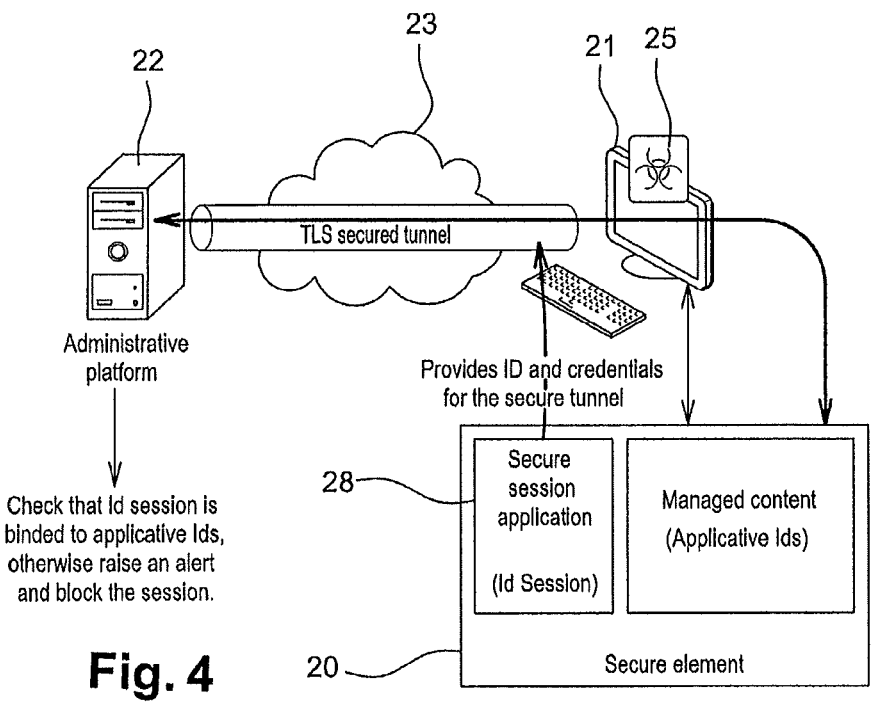

The present improvement will be better understood by reading the following description of the FIGS. 3 and 4 where:
  FIG. 3 represents a first step of the method of the present improvement;
  FIG. 4 represents a second step of the method of the present improvement.

The invention proposes to insert in the secure element an independent application which is used to secure the session between the administrative platform and the terminal. After this step, the server verifies the binding between the identity at the device session level and the identity at the secure element remote management.

FIG. 3 represents a first step of the method of the present invention.

As can be seen, the secure element 20 comprises an application 28 foreseen to provide session keys to the administrative platform 22. These session keys are generated by the application 28 and transmitted to the equipment 21. The application 28 transmits also an identifier or a certificate to the equipment 21:
  An identifier is sent from the application 28 to the equipment when a symmetrical encryption is used (on the basis of secret keys) for creating a secure channel between the platform 22 and the equipment 21. The equipment 21 transmits this identifier to the platform 22. The platform 22 then compares the received identifier with identifiers it stores, in order to recognize which application sent the identifier. Once recognized, the platform 22 associates a symmetrical key to the identifier of the application 28. The application 28 and the platform 22 then derive session keys in order to encrypt (for confidentiality reasons) and maintain the integrity of the communication between the equipment 21 and the platform 22. A secure channel has thus been established between the equipment 21 and the platform 22 (examples of such protocols are standardized by Global Platform, PSK-TLS can also be used).
  Another way to create this secure channel consists in exchanging certificates between the platform 22 and the application 28. The platform authenticates the application 28 by asking it to sign a hash of all the messages already exchanged. The equipment 21 generates a session key and encrypts it for the platform 22. A secured communication (one example of such a standardized is TLS) is then established between the equipment 21 and the platform 22.

In both of the preceding cases a secure channel has been established between the platform and the equipment 21.

The main second step of the invention consists in verifying the binding between the identity at the device session level and the identity at the secure element remote management.

FIG. 4 represents this step.

A request to manage content of the secure element is sent to the administrative platform. This management consists for example in downloading content on the secure element 20, deleting or exporting content stored on it or activating or deactivating content stored on it. The download of content can for example consist in downloading an entire Sim application on the secure element, with the associated credentials (IMSI, Ki). It can also consist in downloading a phone book in the secure element 20 from the platform 22.

In order to verify this binding, the secure element 20 sends through the established secure channel a fixed identifier, like for example his ICCID or his serial number. The platform 22 verifies that this request originates from the same secure element (for example the session keys used for establishing the secure channel are compared to the fixed identifier). If the check is positive, the management is authorized. On the contrary, if the check is negative, the management is forbidden.

The invention ensures that the secure element that is managed is the correct one and not another secure element linked to the platform by a malware.

The equipment 21 can be mobile or fixed, for example constituted by a machine.

The invention claimed is:

1. A method for managing content on a secure element connected to an equipment, said content being managed on said secure element from a remote administrative platform, wherein said method comprises:
    establishing, at the level of said administrative platform a secure channel between said equipment and said administrative platform, using session keys generated by said secure element and transmitted to said equipment, wherein establishing said secure channel includes transmitting a first identifier corresponding to said session keys to said administrative platform from said equipment;
    transmitting from said secure element to said administrative platform a request to manage content of said secure element using said secure channel, wherein the request includes a second identifier; and
    verifying at the level of said administrative platform that said request originates from the same secure element that has generated said session keys, said verification including verifying that said first identifier, received from said equipment corresponds to said second identifier, received from said secure element, and verifying that said session keys correspond to said first identifier and, if positive, authorizing said management and, if negative, forbid said management.

2. A method according to claim 1, wherein said management comprises in at least one of the following tasks:
    downloading content on said secure element;
    deleting content on said secure element;
    exporting content stored on said secure element;
    activating content stored on said secure element; and
    deactivating content stored on said secure element.

3. A method according to claim 1, wherein said verification comprises in verifying that a private key used for establishing said secure channel corresponds to a certificate delivered to the secure element on which the management is requested.

4. A method according to claim 1, wherein said equipment is a mobile equipment.

5. A method according to claim 1, wherein said equipment is a fixed equipment.

6. A method according to claim 1, wherein said secure element is a removable Universal Integrated Circuit Card.

* * * * *